Jan. 30, 1934.    M. VILLARD    1,945,209
COMPENSATED UNIVERSAL JOINT
Filed Jan. 6, 1931    2 Sheets-Sheet 2

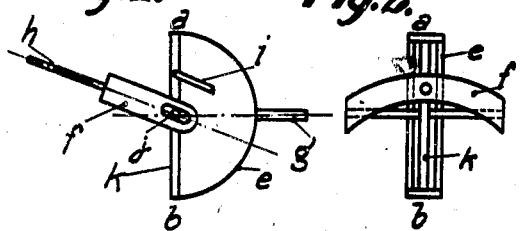
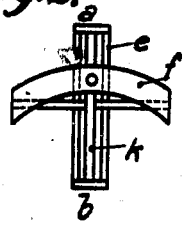
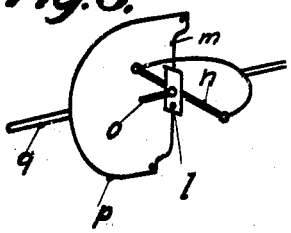
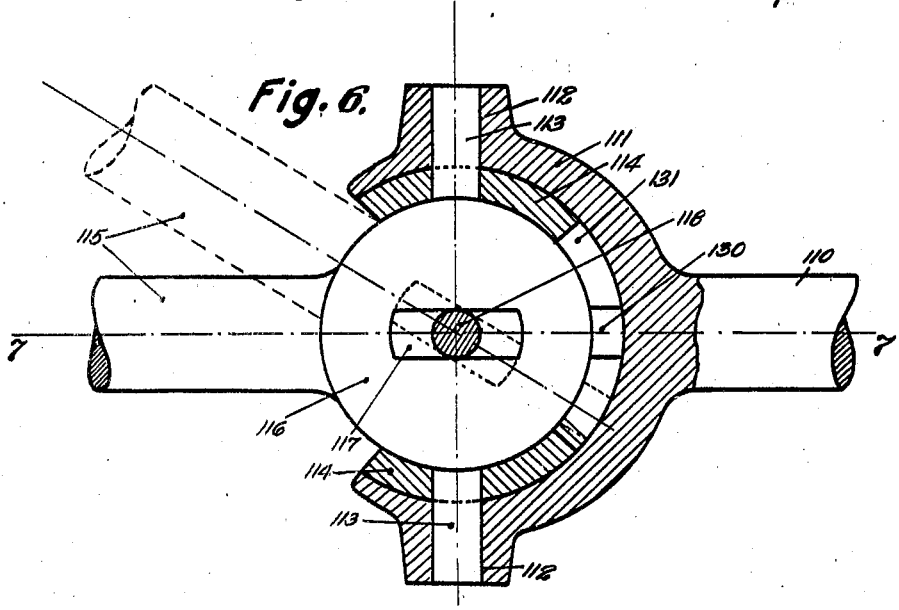
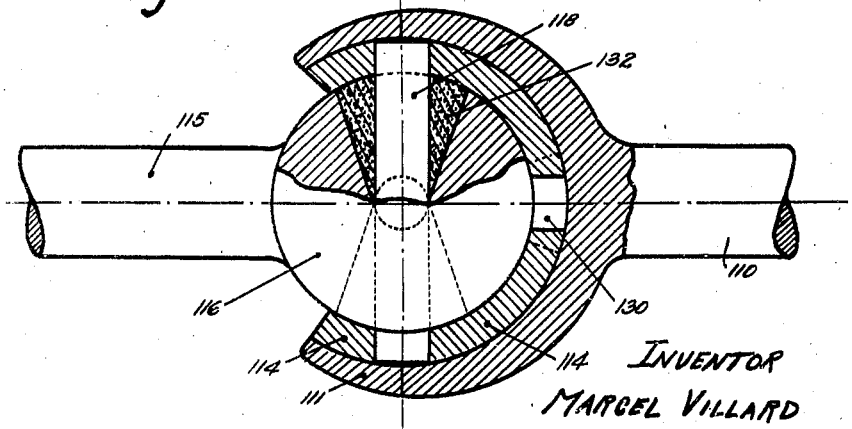

INVENTOR
MARCEL VILLARD
By Church & Church
his atty

Patented Jan. 30, 1934

1,945,209

UNITED STATES PATENT OFFICE 1,945,209

COMPENSATED UNIVERSAL JOINT

Marcel Villard, Paris, France

Application January 6, 1931, Serial No. 506,988, and in France April 1, 1930

4 Claims. (Cl. 64—91)

My invention relates to universal joints and has to do, more particularly, with universal joints of the self compensated type in which the speed of the driven element is maintained substantially constant with respect to the speed of the driving element.

It is a characteristic of universal joints of the simple gimbal type, when operating to impart motion to a shaft disposed at an angle with respect to the driving shaft, that the motion imparted is not symmetrical with respect to that received, but is variable, the driven element of the joint going through a period of accelerated motion and a period of decelerated motion during each half revolution of the joint. The objections to such a joint are self apparent. Naturally, wear upon the joint, the mechanism driving the joint, and the mechanism driven by the joint, is greater than would occur if the speed of the driven element were maintained substantially symmetrical or constant with respect to that of the driving element. Moreover, in many machines, it is of great importance that the motion of the mechanism driven be substantially identical with the motion of the mechanism furnishing the drive.

Accordingly, it is the primary object of my invention to provide a compensated universal joint of simple construction which will impart motion which is substantially identical with the drive received.

It is another object of my invention to provide a compensated universal joint which is compact and may be employed as a self contained unit in locations of limited size, as for example, adjacent the steering axles of front drive automobiles.

It is another object of my invention to provide a compensated universal joint, the maximum permissible angularity of which is such that it may be used at the steering knuckles of a vehicle axle the wheels on which are mounted for the driving as well as the steering function.

It is a further object of my invention to provide a compensated universal joint of strong and efficient construction which is simple, easy to take apart, and may be manufactured by production methods at low cost.

Further objects and objects relating to details and economies of construction will readily appear from the detailed construction to follow.

In the accompanying drawings:

Figure 1 is a diagrammatic illustration of a gimbal joint structure in which my invention is capable of embodiment;

Fig. 2 is a similar diagrammatic illustration of the same joint taken at right angles to the view shown in Fig. 1;

Fig. 3 is a perspective diagrammatic view of a modified universal joint construction in which the concept of my invention may be demonstrated;

Fig. 6 is a longitudinal sectional view of a compensated universal joint construction constituting another embodiment of my invention;

Fig. 7 is a longitudinal sectional view of the same joint taken on the line 7—7 of Fig. 6.

Like reference characters refer to like parts throughout the several views.

Briefly, my invention consists in the provision, in a simple two fork, single gimbal, universal joint, of means whereby the angle formed by one of the forks and the engaged cross pin or pins of the gimbal is so positioned during rotation of the joint, as to provide, at all stages in its rotation, substantial symmetry or identity of motion between the driven and driving connections of the joint.

More specifically, and with reference to the accompanying drawings in which several modifications are shown representing several of the structures in which my invention is capable of embodiment, Figs. 1 and 2 represent a universal joint having the connected shafts "g" and "h" which terminate in forks "e" and "f" and are coupled by means of what may be described as a "cross bar", "pivot spider", or "single gimbal" "K". In such a joint, where the spider has its ends snugly and squarely journaled in the forks, the motion of the shafts "g" and "h" will be symmetrical as long as, and only as long as, the shafts are in alinement. Angularity in the shaft relationship results in the motion in the "driven" or power-take-off shaft being uneven with respect to the other or "driving" shaft. This uneven motion is characterized by a period of acceleration and a period of deceleration during each half revolution of the joint.

I have found that by slotting the ends of one of the forks as shown at "j" so that the associated ends of the spider "K" may oscillate to either side of the center of the slot, and by appropriately oscillating the spider "K" about its axis a—b in fork "e" through the medium of the arm or handle "i", it is possible to substantially completely compensate for the uneven or asymmetrical movement of the driving shaft above pointed out.

In Fig. 3, I have disclosed a somewhat different arrangement for accomplishing the same result. There, however, instead of slotting the fork "p" on the shaft "g", the pivot spider has one straight arm "n" which is journaled in the other fork, and the other arm "m" is formed, at its ends, with cranks or offsets the extremities of which are journaled in the fork "p". Thus when the arm "m" is appropriately oscillated as by handle "o", substantially symmetrical shaft movement is effected even when the angularity of the joint is great.

Figure 4:
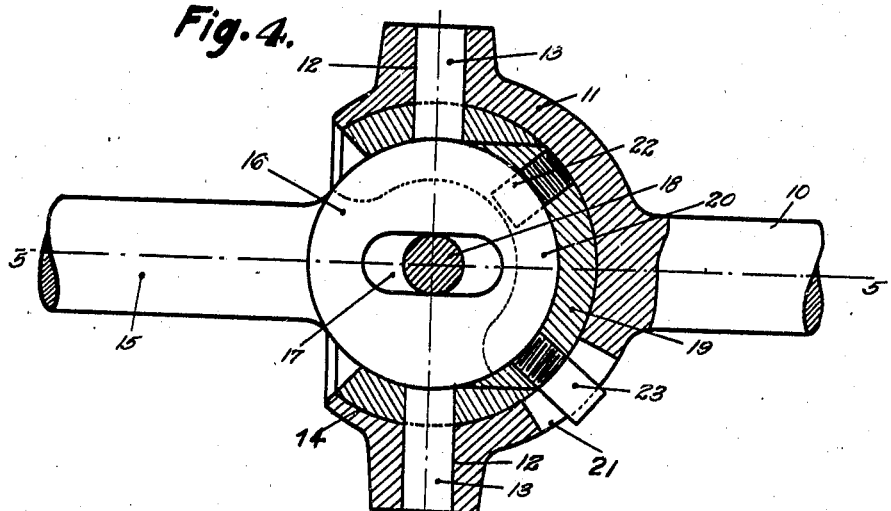
Fig. 4 is a longitudinal sectional view of a preferred universal joint construction embodying my invention.
Figure 5:
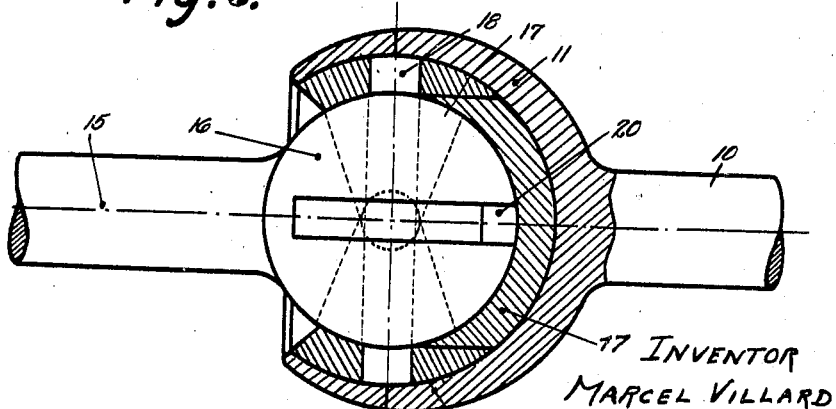
Fig. 5 is a longitudinal sectional view of the same joint taken on the line 5—5 of Fig. 4.

In Figs. 4 and 5 I have shown a preferred structural embodiment of my invention in cross section. For the lack of a better term it is necessary to employ the word "fork" in its functional sense, as here embodied; that is, without being limited to include only such members as are of Y form. The present joint consists of a shaft 10 the end of which is formed into a socket member 11, the interior shape of which is spherical, having a single geometrical center. Diametrically opposed, and having their common axis perpendicular to the axis of the shaft 10, and passing through the geometrical center, are a pair of apertures 12, in which are received two pivot pins or trunnions 13. Snugly received within the cavity of the socket member 11, and mounted for oscillation about the pins 13, is a ring member 14 having a spherical inner surface within which is snugly received the ball end 16 of the shaft 15. Ball 16 is provided with a central slot, or mortise 17, which passes entirely therethrough. A transverse pin 18 is mounted in the ring member 14 and extends perpendicularly to the axis of pins 13 passing through the slot 17. Thus it will be seen that the shaft 15, with its ball joint 16, may assume an angular position with respect to the shaft 10, and the gimbal, constituted by the ring 14 and pin 18, may be oscillated on the axis of the pivot pins 13 and, when the shafts 10 and 15 are not in line, such oscillation will effect relative rotary movement therebetween, just as occurs when the pivot spider "K" in the joint illustrated in Fig. 1 is oscillated on the axis a—b.

For the purpose of automatically providing, in the ring member 14, oscillatory movement which is appropriate and necessary to satisfactorily compensate for the uneven or asymmetrical movement of the driven shaft with respect to the driving shaft of the joint, I provide a cap member 19, which is disposed in and occupies that portion of the space between the ball 16 and the spherical socket member 11 not ocupied by the ring member 14. Cap member 19 thus abuts the ring member 14, and orbital motion thereof about the axis of the pivot pins 13, will effect oscillation of the ring member 14. For the purpose of imparting such motion to the cap member 19 as will effect appropriate compensating oscillatory movement of the ring member 14 and its pin 18 for any existing degree of angularity between the shafts 10 and 15, I provide in this embodiment, a slot 20 in the surface of the ball 16, which slot is disposed in the longitudinal plane of the shaft 15 at right angles to the slot 17 of the ball. A slot 21 is provided in the socket member 11, which slot is in the common plane of the pivot pins 13 and the shaft 10. Pins 22 and 23 are anchored in the cap member 19 and extend into and are engaged by, respectively, the slot 20 and slot 21 of the ball 16 and socket member 11. Pins 22 and 23 are equidistant from the axis of the shaft 10 when the shaft 15 is in alinement therewith. However, when the joint rotates with the shafts 10 and 15 out of alinement, the cap member 19 is caused, by the walls of the slot 20 and their engagement with pin 22, to take on a swinging movement about its pin 23 as a pivot, which pin 23 also slides a sufficient amount in slot 21, in the plane of the shaft 10 and the pivot pins 13, to permit the displacement of the cap member 19. This swinging movement of the cap 23 is transmitted to the ring member 14 and its pin 18 as an oscillatory motion which motion adequately compensates for the differential motion which would occur between the shafts 10 and 15 were the pin 18 rigidly maintained at right angles to the axis of the shaft 10 as in conventional uncompensated gimbal joints.

Figure 8:
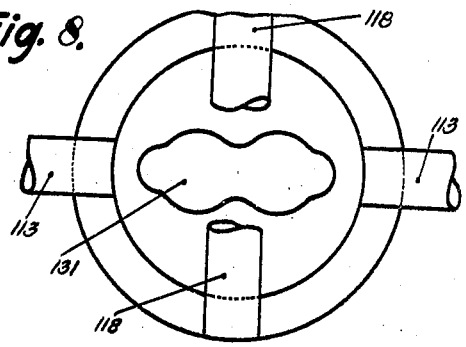
Fig. 8 is a detail view showing the geometrical form of the compensating slot used in the universal joint construction illustrated in Figs. 6 and 7.

In Figs. 6 and 7, I have shown a modified structure for accomplishing the same result as that provided by the joint structure in Figs. 4 and 5. This compensated joint comprises a shaft 110 terminating in a spherical socket member 111, provided with diametrically opposed apertures 112 and trunnions or pivot pins 113 having their common axis passing through the geometrical center of the spherical socket member 111. A second shaft 115 terminates in a ball 116 of smaller diameter than said socket member 111. Ball 116 is held concentrically within the socket member by a spherical shell 114 journaled upon pins 113. The spherical shell 114 is provided with a transverse pin 118 which is disposed at right angles to the axis of the pins 113 and passes through a transverse slot 117 in the ball 116. Thus far set forth, the structure of the joint shown in Figs. 6 and 7 is substantially identical with that of the joint shown in Figs. 4 and 5. For the purpose of effecting appropriate oscillatory movement of the shell member 114 about the axis of the pins 113, there is provided a compensating means comprising a pin 130, which is anchored in the ball 116, coaxially with respect to the shaft 115 and extends radially into a slot 131, formed in the shell member 114. As shown in Fig. 8, this slot 131 is of such shape that the engagement of the pin 130 therewith will cause the shell member 114 and its pin 118 to oscillate about the axis of pins 113, when the joint is rotated, in proper accordance with angularity existing between the shafts 110 and 115, thus compensating for the differential motion which would occur therebetween should the pin 118 be rigidly maintained at right angles to the axis of the shaft 10 as in conventional, uncompensated gimbal joints. For the purpose of urging the pin 118 to assume a central position in the slot 117, that is, to remain at right angles to the axis of the shaft 115, the slot is provided with a compressible resilient element 132 which yields under the displacing influence of the pin 130 upon the walls of the slot 131 formed in the shell member 114.

I have disclosed several forms of my invention for the purpose of illustrating the principles thereof, but not with any idea of exhaustively disclosing all the forms in which it is capable of embodiment. I am aware that the concept of my invention is capable of embodiment in many structural forms, and that numerous changes may be made in the universal joint structures disclosed without departure from the basic inventive concept thereof. As has already been stressed, while the preferred embodiments shown disclose ball and socket forms of joints, such ball and socket elements are functional equivalents, in a broad sense, of "forks". In view of the breadth of my invention, I do not intend that it shall be limited to the specific forms disclosed, but only in accordance with the terms of the following claims.

What I claim is:

1. A compensated universal joint comprising driven and driving members, a gimbal coupling said members and having pivots the axes of which are disposed at right angles to each other, said gimbal being mounted for movement with respect to one member about both of said pivot axes and being journaled for pivotal movement with respect to the other member about one of said axes, and a gimbal-actuating device slidably and pivotally mounted in one of said members providing an oscillatory movement of said gimbal about the last-named axis once during each revolution of said gimbal, the angular amplitude of which oscillatory movement is one-half the angle defined by the axes of rotation of said driven and driving members.

2. A compensated universal joint comprising driven and driving members, a gimbal coupling said members, said gimbal being mounted for pivotal movement with respect to one of said members and oscillatory movement with respect to the other of said members, and gimbal-actuating means effecting and determining the oscillatory movement of said gimbal with respect to second-mentioned member, said means comprising an element engaged with said gimbal, an element engaged with said first member and an element engaged with said second member, said last three elements being so associated with said two members and said gimbal as to position said gimbal in the bi-sector plane of the angle defined by the axes of rotation of said driven and driving members each time the pivotal axis of said gimbal in said first member is disposed at right angles to the plane defined by the axes of rotation of said driven and driving members.

3. A compensated universal joint comprising driven and driving members, one of said members terminating in a spherically-shaped socket, the other of said members terminating within said socket in a slotted ball of smaller diameter than said socket, a gimbal concentrically rotatively coupling said ball and socket and having the form of a spherically-shaped ring snugly engaging said ball, snugly engaged in said socket and mounted in the latter for pivotal movement about an axis disposed at right angles to the axis of rotation of said socket, said gimbal including a transverse pin disposed in the slot in said ball at right angles to the axis of rotation of the ring in said socket and free to oscillate in said slot on said last-mentioned axis, and a gimbal-actuating device slidably and pivotally mounted in one of said members providing an oscillatory movement of said gimbal and its pin during each revolution of the joint, the angular amplitude of which oscillatory movement is one-half the angle defined by the axes of said driven and driving members.

4. A compensated universal joint comprising driven and driving members, one of said members terminating in a spherically-shaped socket, the other of said members terminating within said socket in a slotted ball of smaller diameter than said socket, a gimbal concentrically coupling said ball and socket and having the form of a spherically-shaped ring snugly engaging said ball, snugly engaged in said socket and mounted in the latter for pivotal movement about an axis disposed at right angles to the axis of rotation of said socket, said gimbal including a transverse pin disposed in the slot in said ball at right angles to the axis of rotation of the ring in said socket on said last-mentioned axis, and means effecting and determining an oscillatory movement of said gimbal and its pin during each revolution of the joint, the angular amplitude of which oscillatory movement is one-half the angle defined by the axes of said driven and driving members, said last-mentioned means comprising a cap element disposed in the space between said ball and said socket not occupied by said ring, a slot in said socket, a pin mounted in said cap element and having a portion slidably engaged in said socket slot, a slot in the external surface of the ball, and a second pin in said cap element and slidably engaged in the last-mentioned ball slot.

MARCEL VILLARD.